(12) United States Patent
Kakish

(10) Patent No.: US 8,595,894 B1
(45) Date of Patent: Dec. 3, 2013

(54) HAND-HELD PEST VACUUM

(76) Inventor: Issa Kakish, Ajax (CA)

( * ) Notice: Subject to any disclaimer, the term of this patent is extended or adjusted under 35 U.S.C. 154(b) by 48 days.

(21) Appl. No.: 13/467,311

(22) Filed: May 9, 2012

Related U.S. Application Data (60) Provisional application No. 61/483,917, filed on May 9, 2011.

(51) Int. Cl.
*A47L 5/24* (2006.01)
*A01M 1/06* (2006.01)

(52) U.S. Cl.
USPC ............... 15/339; 15/344; 15/352; 43/107; 43/139

(58) Field of Classification Search
USPC .............. 15/339, 344, 352; 43/107, 139
IPC ........................ A01M 1/06; A47L 5/24
See application file for complete search history.

(56) References Cited

U.S. PATENT DOCUMENTS

| | | | |
|---|---|---|---|
| 4,488,331 A | 12/1984 | Ward | |
| 4,780,986 A | 11/1988 | Broomfield et al. | |
| 4,858,376 A | 8/1989 | Reed | |
| 4,979,330 A | 12/1990 | Rorant | |
| 5,052,147 A | 10/1991 | Broomfield et al. | |
| 5,074,006 A * | 12/1991 | Eremita | 15/344 |
| 5,175,960 A | 1/1993 | Wade et al. | |
| 5,222,322 A | 6/1993 | Mastromonaco | |
| 5,367,821 A | 11/1994 | Ott | |
| 5,402,598 A | 4/1995 | Wade et al. | |
| 6,131,239 A * | 10/2000 | White | 15/352 |
| 6,202,343 B1 | 3/2001 | Mah | |
| 6,640,489 B1 | 11/2003 | Boulton | |
| 6,651,380 B2 | 11/2003 | Wyers | |

* cited by examiner

*Primary Examiner* — David Redding
(74) *Attorney, Agent, or Firm* — Montgomery Patent & Design; Robert C. Montgomery (57) ABSTRACT

A battery-powered insect removal device comprises a funnel-shaped housing further including a cylindrical handle which has a fan motor, a battery, an operating switch, and electrical components which generate a vacuum across the opening of the funnel. During use, the device is electrically activated and then placed near a flying or crawling insect. The vacuum will draw the insect inside where it is exterminated by a plurality of fan blades and collected within and interior receptacle. The receptacle is removable for emptying and cleaning.

19 Claims, 5 Drawing Sheets

HAND-HELD PEST VACUUM

RELATED APPLICATIONS

The present invention was first described in and claims the benefit of U.S. Provisional Application No. 61/483,917 filed May 9, 2011, the entire disclosures of which are incorporated herein by reference.

FIELD OF THE INVENTION

The present invention relates generally to vehicle safety belts, and in particular, to a child-proof locking cover for a vehicle safety belt.

BACKGROUND OF THE INVENTION

There are a wide variety of products designed to eliminate the presence of insects in both indoor and outdoor environments. These products include insecticide sprays, electronic insect repellant systems, acoustic repellent systems, and even old-fashioned flyswatters. While these various solutions work in some manner or another they do have many unwanted side effects. These side effects include hazardous chemicals, dangerous high voltages, exposure to unsanitary conditions, and the like. These conditions are especially worrisome when children or pets are present. Accordingly, there exists a need for a means by which all types of flying and crawling insects can be removed from almost any location in an easy manner and without worrisome side effects. The development of the hand-held pest vacuum fulfills this need.

Various attempts have been made to provide a hand-held pest vacuum. Examples of these attempts can be seen by reference to several U.S. patents. U.S. Pat. No. 4,858,376, issued in the name of Reed, describes an insect trap apparatus. This patent discloses a device with a reversible motor that creates a vacuum to secure and eject an insect. This patent does not disclose a receptacle for collecting dead pests for later disposal.

U.S. Pat. No. 4,979,330, issued in the name of Rorant, describes a suction insect trap device. This patent discloses a vacuum pump device with a receiving container for collecting insects for later release. This patent does not disclose an internal fan blade assembly designed to eliminate pests.

U.S. Pat. No. 5,175,960, issued in the name of Wade, describes a pest collection disposal device. This patent discloses a vacuum pump device that traps and secures insects in a disposable, telescoping tube between a filter and a flap assembly. This patent does not disclose an internal fan blade assembly designed to eliminate pests.

U.S. Pat. No. 5,367,821, issued in the name of Ott, describes a suction insect trap apparatus. This patent discloses a vacuum pump device for capturing insects within a container for the purpose of later releasing the insect without excessive harm. This patent does not disclose an internal fan blade assembly designed to eliminate pests.

U.S. Pat. No. 5,402,598, issued in the name of Wade, describes a pest collection disposal device. This patent discloses a vacuum pump device that traps and secures insects in a disposable, telescoping tube between a filter and a flap assembly. This patent does not disclose an internal fan blade assembly designed to eliminate pests.

While these devices fulfill their respective, particular objectives, each of these references suffer from one (1) or more disadvantages. Many such devices are not suited for trapping insects, eliminating the trapped insects, and then collecting the eliminated insects within a removable receptacle for later disposal. Accordingly, there exists a need for hand-held pest vacuum without the disadvantages as described above. The development of the present invention substantially departs from the conventional solutions and in doing so fulfills this need.

SUMMARY OF THE INVENTION

The inventor has recognized the aforementioned inherent problems and lack in the art and observed that there is a need for a device to secure and eliminate a pest such as an insect without the use of hazardous chemicals, high voltage of electricity, or exposure to unsanitary conditions.

Accordingly, it is an object of the present embodiments of the invention to solve at least one (1) of these problems. The inventor has addressed this need by developing a hand-held pest vacuum that traps and eliminates pest for later disposal.

To achieve the above objectives, it is an object of the present invention to provide a device comprising a housing, a fan blade assembly, and a receptacle.

Another object of the present invention is where the housing comprises a shape similar to a large flashlight.

Yet still another object of the present invention is where the housing is constructed of a durable, waterproof material such as plastic, aluminum, or coated steel.

Yet still another object of the present invention is where the housing comprises an elongated cylindrical handle portion to provide easy gripping for a user.

Yet still another object of the present invention is where the elongated cylindrical handle portion comprises an open-topped conical mouth portion having an open end portion.

Yet still another object of the present invention is where the internal fan blade assembly is comprised within the housing.

Yet still another object of the present invention is where the fan blade assembly creates a downward flow of air to produce a vacuum effect in order to pull pests into the open end of the mouth.

Yet still another object of the present invention is where the housing comprises a cylindrical section of screen.

Yet still another object of the present invention is where the screen provides an exit for a flow of air created by the fan blade assembly.

Yet still another object of the present invention is where the screen is shaped to have a grid pattern with openings small enough to prevent a pest from escaping.

Yet still another object of the present invention is where the mouth portion comprises a plurality of air flow apertures.

Yet still another object of the present invention is where the mouth portion of the device can be pressed directly against a flat surface while air enters the device through the plurality of air flow apertures.

Yet still another object of the present invention is where the internal fan blade assembly is powered by an internal motor.

Yet still another object of the present invention is where the motor is powered by at least one (1) direct current battery.

Yet still another object of the present invention is where the battery is housed within the handle portion of the housing.

Yet still another object of the present invention is where the internal fan blade assembly cools the motor.

Yet still another object of the present invention is where the motor is activated by a switch located on the handle portion of the housing.

Yet still another object of the present invention is where pests are exterminated by the internal fan blade assembly.

Yet still another object of the present invention is where the eliminated pest is collected in a basket-like receptacle.

Yet still another object of the present invention is where the receptacle is removably attached to the handle portion of the housing.

Yet still another object of the present invention is to provide a method of utilizing the device that may be achieved by performing the following steps: installing a fresh set of batteries into the handle portion of the handle of the device; inserting the receptacle into the handle portion of the housing; sliding or depressing the switch in order to activate the motor and initiate rotation of the fan blade assembly; creating a flow of air which in turn provides a vacuum area within the mouth portion of the device; placing the mouth of the device in the vicinity of a pest to draw the pest into the mouth and through the fan blade assembly; collecting the exterminated pest within the receptacle; and removing, emptying, and cleaning the receptacle when full or when finished using the device.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 hand-held pest vacuum
20 housing
21 handle
22 mouth
23 air flow apertures
24 screen
26 receptacle
27 inner space
28 dividing platform
29 slot
30 fan blade assembly
31 shaft
32 motor
34 battery
36 switch
38 battery access cap
40 flow of air
50 stop
51 shoulder
100 pert
105 user

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a hand-held pest vacuum (herein described as the "device") 10, which provides an enhanced means for trapping and disposing of pests 100, such as insects and spiders in a manner which is quick, portable, and sanitary. The device 10 is designed for hand-held use in a portable manner. A thin portion 30 of the device 10 produces a vacuum zone which helps a user 105 to catch and exterminate pests 100 and subsequently dispose of them. Furthermore, the device 10 exterminates pests 100 in a manner which may be entertaining to the user 105.

Figure 1:
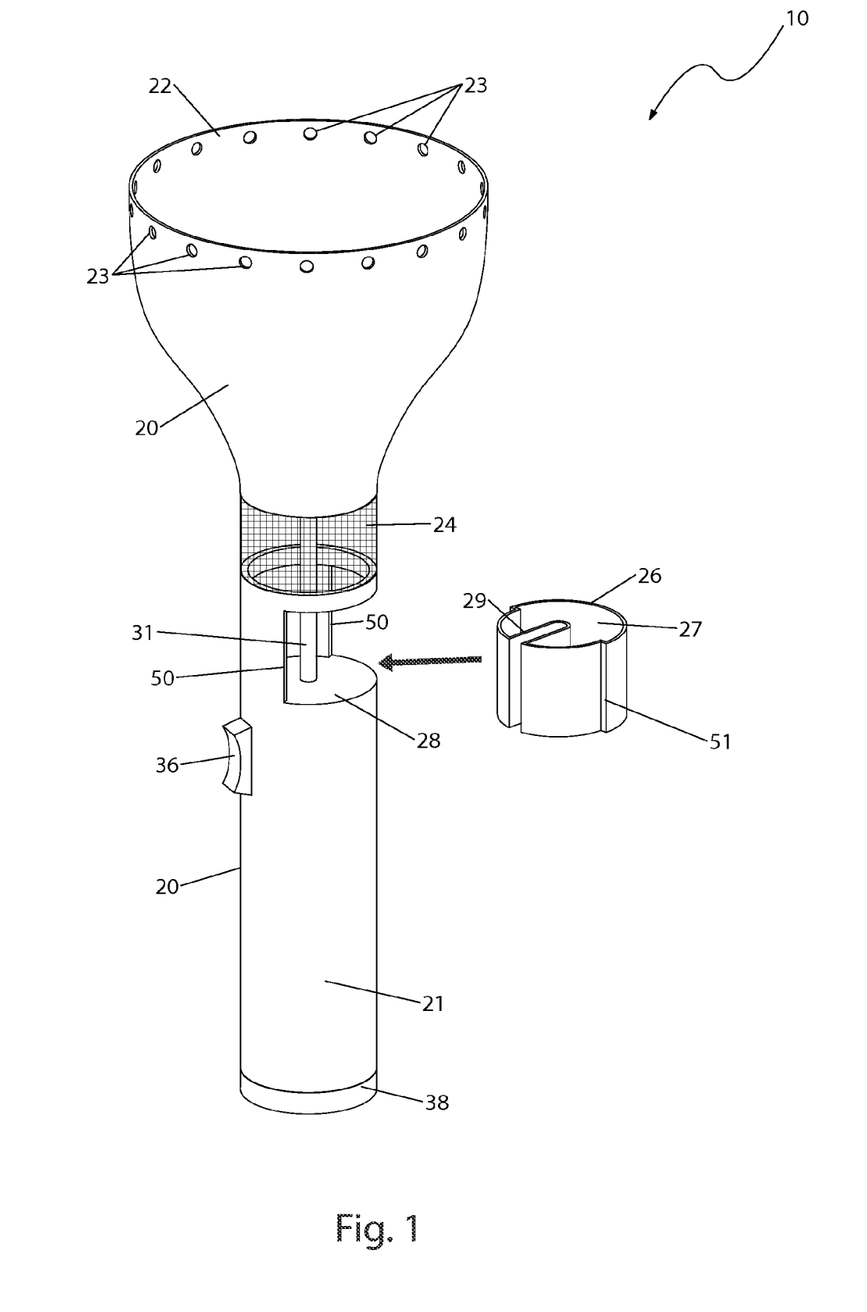
FIG. 1 is a perspective view of a hand-held pest vacuum 10, according to a preferred embodiment of the present invention.

Referring now to FIG. 1, a perspective view of the device 10, according to a preferred embodiment of the present invention, is disclosed. The device 10 comprises a housing 20 which provides protection and internal mounting of various components required to capture and exterminate the pests 100. The housing 20 comprises an external shape similar to that of a large flashlight, thereby providing easy gripping by a user 105. The housing 20 comprises an elongated cylindrical handle portion 21 which transitions into an open-topped conical or bowl-shaped mouth portion 22 having an open end portion. The housing 20 is constructed of a durable, waterproof material such as a plastic, aluminum, plated or painted steel, or the like. In the preferred embodiment, the handle 21 is approximately two inches (2 in.) in diameter and fifteen inches (15 in.) in height while the mouth 22 is approximately eight inches (8 in.) tall and one foot (1 ft.) in diameter at the open end portion. However, it is understood that the device 10 may be introduced in various sizes such as small, medium, and large, based upon a user's 105 preference with equal benefit, and as such should not be interpreted as a limiting factor of the device 10. The device 10 creates an inward flow of air 40 which produces a vacuum effect in order to pull pests 100 into the mouth 22 (see FIG. 2).

The pests 100 are exterminated by an internal fan blade assembly 30 powered by internal motor 32 and shaft 31 portions before falling into a subjacent receptacle 26 which comprises a cylindrical basket-like structure with a slot 29 to accommodate extension of the vertical shaft 31 therethrough. The receptacle 26 is removably attached to the housing 20 so that the user 105 can dispose of dead pests 100 which are collected within an inner space portion 27 of the receptacle 26.

Figure 2:
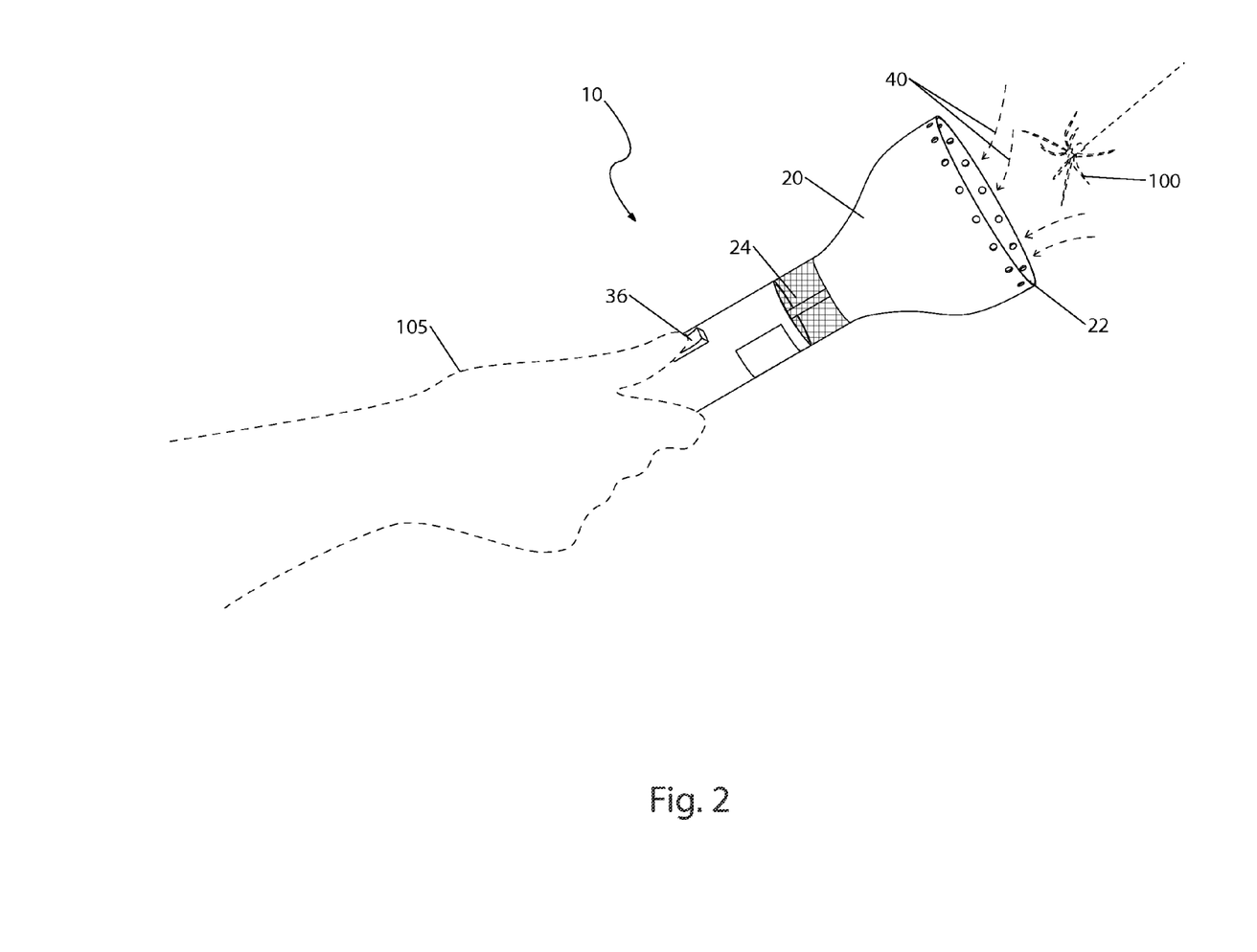
FIG. 2 is an environmental view of a hand-held pest vacuum 10 depicting an in-use state, according to a preferred embodiment of the present invention.

Referring now to FIG. 2, an environmental view of the device 10 depicting an in-use state, according to a preferred embodiment of the present invention, is disclosed. During use, a user 105 directs the mouth portion 22 of the device 10 toward one (1) or more pests 100 which are in turn drawn into the opening portion of the mouth 22 via a flow of air 40 created by a subjacent rotating fan blade assembly 30. The exterminated pests 100 are subsequently accumulated within the internal receptacle 26 for disposal (see FIGS. 1 and 3).

Figure 3:
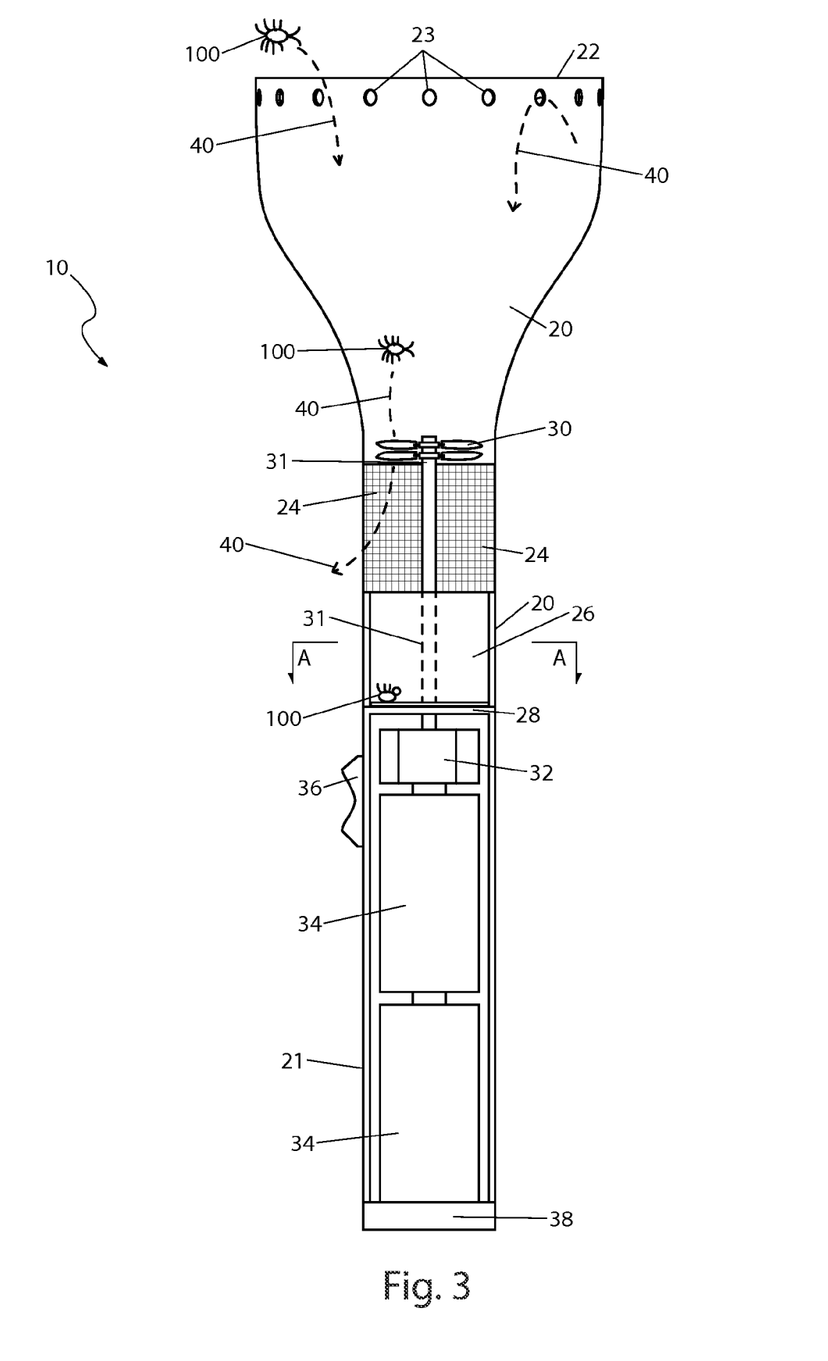
FIG. 3 is a section view of the hand-held pest vacuum 10, according to a preferred embodiment of the present invention.

Referring now to FIG. 3, a section view of the device 10 is disclosed. The device 10 creates a downward flow of air 40 which produces a vacuum effect within the mouth 22 in order to pull in pests 100. The flow of air 40 is created by the fan blade assembly 30 which is located at an interior upper end of the handle 21 immediately adjacent to the mouth 22. The fan blade assembly 30 comprises a plurality of fan blades attached to an upper end portion of a central shaft 31. It is understood that the fan blade assembly 30 may comprise any number of blades arranged around the shaft 31 and may also comprise a number of rows of blades as space constraints will allow, and as such should not be interpreted as a limiting factor of the device 10. The shaft 31 extends from the fan blade assembly 30 downwardly through the handle 21 being integrated into an electric motor 32 at a bottom end portion within the handle 21.

The arrangement of the blade portions of the fan blade assembly 30 provides a pulverizing means to pests 100 which are drawn into the device 10 prior to falling downward into the cylindrical receptacle 26 for subsequent disposal. The fan blade assembly 30 comprises an outer diameter which is very slightly smaller than a corresponding inner diameter of the handle 21.

A portion of the handle 21 located immediately below the fan blade assembly 30 comprises a cylindrical section of screen 24 which provides an exit path for a flow of air 40 created by the fan blade assembly 30. The screen 24 comprises an integral wall portion of the housing 20. The screen 24 is preferably constructed of a structurally rigid material having a cylindrical shape similar in diameter as the handle 21. The screen 24 provides structural stability to the housing 20 and enables an outward flow of air 40 to continue in an unimpeded manner through the mouth 22, through the fan blade assembly 30, and out through the screen 24. The screen 24 further comprises a grid pattern having small enough openings so as to entrap the pests 100 causing said pests 100 to fall into the subjacent receptacle 26 (see FIG. 1). The flow of air 40 also provides convective cooling to the motor 32 to mitigate overheating during use.

The motor 32 is located immediately below the receptacle 26 and acts to rotate the shaft 31 and the fan blade assembly 30 when actuated by a switch 36 located along an adjacent side surface of the handle 21. The motor 32 is powered by at least one (1) direct current (DC) battery 34 housed within the handle 21 and being accessed through a battery access cap 38 threadingly attached to a bottom portion of the handle 21. The batteries 34 are located immediately below the motor 32 and preferably comprise a plurality of D-sized zinc-carbon or alkaline batteries arranged in a series manner. The switch 36 comprises a common contact closure device such as a two-position sliding switch, an alternating on/off pushbutton switch, or the like.

Adjacent to the upper perimeter edge portion of the mouth 22, are a plurality of equally-spaced air flow apertures 23 which allow the flow of air 40 to enter the mouth 22 in an event when the top edge portion of the mouth 22 is pressed against a flat surface. This feature allows a user 105 to place the open mouth portion 22 over a pest 100 which is sitting on a flat surface such as a wall or table, and still maintain a flow of air 40 in order to capture the pest 100.

Figure 4:
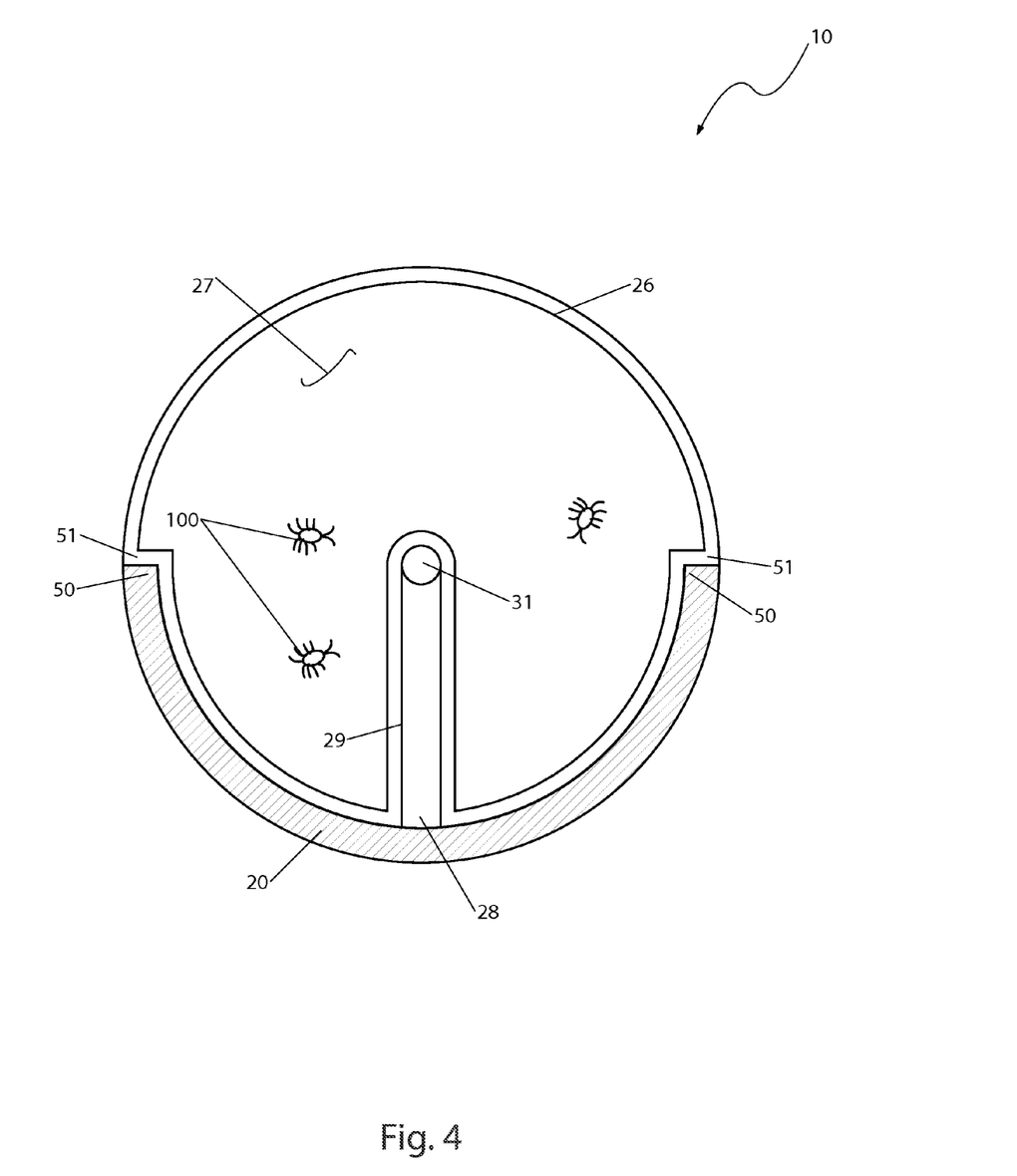
FIG. 4 is a section view of the hand-held pest vacuum 10 taken along section line A-A (see FIG. 3), according to the preferred embodiment of the present invention; and, FIG. 5 is an electrical block diagram of the hand-held pest vacuum 10, according to a preferred embodiment of the present invention.

Referring now to FIG. 4, a cross-sectional view of the device 10 taken along section line A-A (see FIG. 3), is disclosed. The housing 20 comprises a cut-out portion along the handle 21 having an integral provides supported insertion of the receptacle 26 into the handle 21 for emptying and cleaning purposes. The receptacle 26 comprises a cylindrical profile which matches that of the corresponding handle 21. The receptacle 26 comprises a pair of shoulders 51 which abut against a pair of stop portions 50 of the housing 20. When the receptacle 26 is in the inserted "ready" position, the handle 21 comprises an overall continuous cylindrical shape. The slot portion 29 of the receptacle 26 is shaped to allow clearance of the shaft 31 which passes vertically through a center axis within the receptacle 26, thereby allowing free rotation of said shaft 31 during normal use. The receptacle 26 is envisioned to provide ample interior space 27 for the containment of pests 100, thereby maximizing a duration of time before requiring emptying. The receptacle 26 is held in place within the handle 21 preferably by friction, although additional mechanical features such as protrusions and matching recesses, and the like may also be utilized to establish a secure connection. The receptacle 26 can be removed from the housing 20 by gripping the exposed side portions of the receptacle 26 and pulling outwardly.

Figure 5:
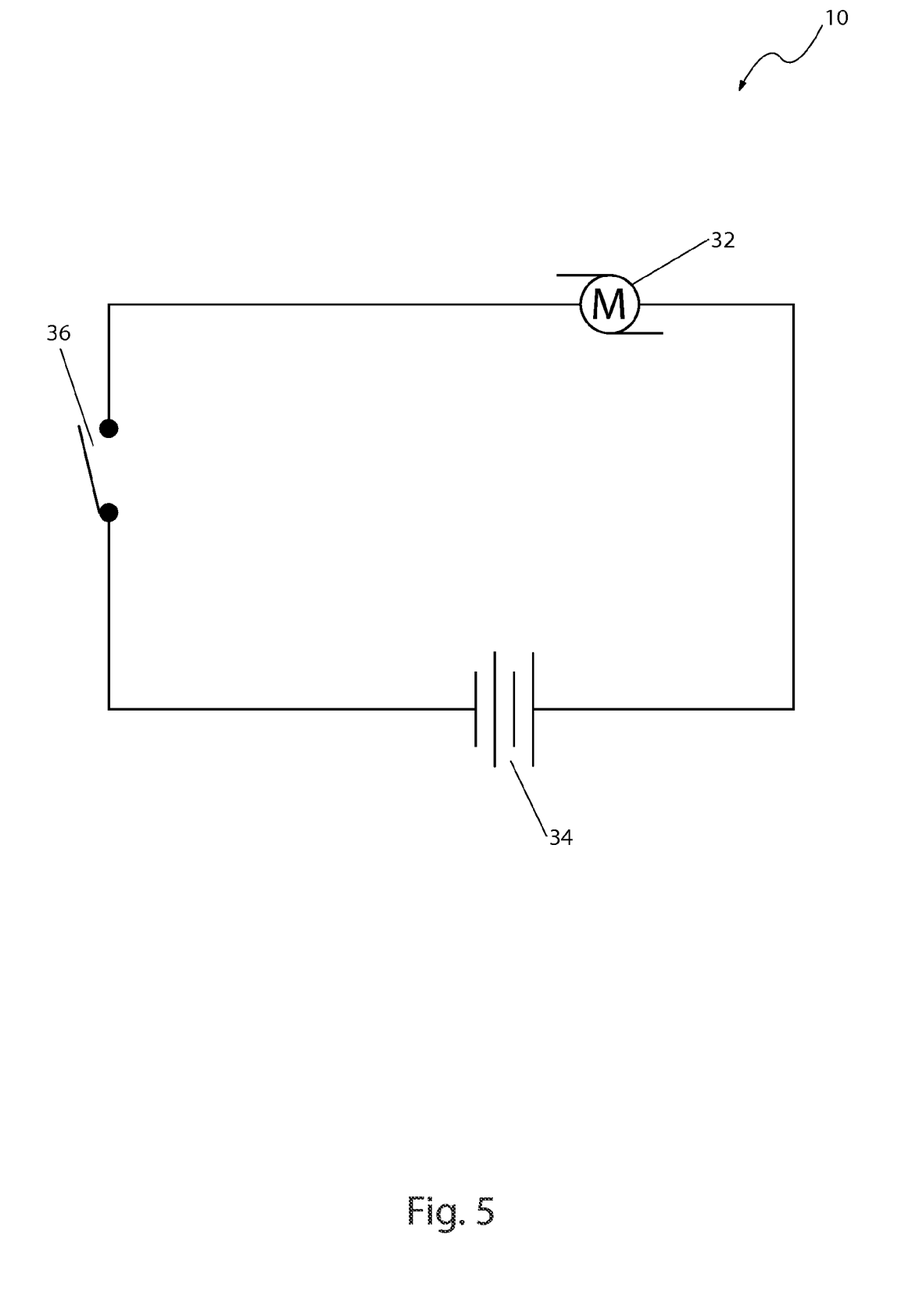

Referring now to FIG. 5, an electrical block diagram of the device 10, according to a preferred embodiment of the present invention, is disclosed. The device 10 comprises a simple direct current (DC) circuit within the handle portion 21 comprising a plurality of disposable or rechargeable DC batteries 34, a contact closure switch 36, a DC motor 32 which rotates the fan blade assembly 30, and interconnecting wiring.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user 105 in a simple and effortless manner with little or no training. After initial purchase or acquisition of the device 10, it would be utilized as indicated in FIG. 2.

The method of utilizing the device 10 may be achieved by performing the following steps: obtaining a model of the device 10 having a desired overall size; installing a fresh set of batteries 34 into the handle 21 using they battery access cap 38; inserting the receptacle 26 into the handle 21, if not previously installed; sliding or depressing the switch 36 in order to activate the motor 32 and initiate rotation of the fan blade assembly 30; creating a flow of air 40 which in turn provides a vacuum area within the mouth portion 22 of the device 10; placing the mouth 22 of the device 10 in the vicinity of a pest 100 to draw the pest 100 into the mouth 22 and through the fan blade assembly 30; collecting the exterminated pest 100 within the receptacle 26; removing, emptying, and cleaning the receptacle 26 when full or when finished using the device 10; and, enjoying an assisted and entertaining pest 100 exterminating method.

The device 10 may also be utilized to capture a pest 100 located upon a wall, table, or other flat surface by placing the mouth 22 against said flat surface in a parallel manner and maintaining a flow of air 40 through the airflow aperture portions 23 of the mouth 22 to capture and exterminate the pest 100. The device 10 is intended to provide various benefits to a user 105 over existing methods of catching and exterminating pests 100. The device 10 is portable and lightweight for hand-held use without need of additional preparation. The device 10 does not utilize any chemicals or other substances which are potentially harmful to people. The device 10 provides a vacuum which assists the user 105 in trapping the pest 100 and does not require significant manual dexterity on the part of the user 105. The device 10 is entertaining due to the nature in which the pests 100 are exterminated.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A hand-held vacuum, comprising:
a housing, comprising a main body and a flared upper end and further having an opening at said housing upper end;
a fan assembly housed within said housing main body and located subjacent to said flared upper end;
a screen located on said housing main body encompassing said fan assembly;
a receptacle removably positioned within a chamber of said housing main body subjacent to said fan assembly;
a motor housed within said housing main body subjacent to said fan assembly, comprising a motor shaft driven by said motor in mechanical communication with and driving said fan assembly;
a divider panel spanning an inner diameter of said housing main body between said chamber and said motor;
a power supply housed within said housing main body subjacent to said motor and in electrical communication therewith; and,
a control switch located on an external surface of said housing main body and in electrical communication with said power supply and said motor for selectively supplying power to said motor;
wherein said vacuum induces an inward flow of air upon rotation of said fan assembly driven by said motor;
wherein said receptacle provides a means for trapping and disposing of pests in a sanitary manner when said pests are entrained within said inward flow of air and pass through said opening and said fan assembly;
wherein said screen permits a circulating flow of said inflow of air through said vacuum; and,
wherein said receptacle comprises a clearance for said shaft of said motor.

2. The vacuum of claim 1, wherein said housing is generally cylindrical and said housing main body is elongated.

3. The vacuum of claim 2, wherein said fan assembly further comprises a plurality of fan blades attached to an upper end portion of said motor shaft;
wherein said plurality of fan blades destroys pests entrained within said inflow of air for subsequent collection in said receptacle.

4. The vacuum of claim 2, wherein said receptacle further comprises:
a generally cylindrical shape having a first side with a diameter generally matching an outer diameter of said housing main body and a second side having an outer diameter generally matching an inner diameter of said housing main body;
a pair of shoulders at each boundary of said first side and said second side;
a collection portion having a floor; and,
a slot inwardly extending from said second side;
wherein said receptacle is removably positioned within said chamber wherein said slot provides clearance for rotation of said motor shaft, said pair of shoulders abuts against a pair of stop portions of said housing main body, and rests upon said divider panel such that said collection portion is subjacent to said fan assembly.

5. The vacuum of claim 2, wherein said screen further comprises a cylindrical mesh material having an outer diameter matching an outer diameter of said housing main body;
wherein said mesh comprises apertures having a size to retain portions of said pests from exiting therethrough.

6. The vacuum of claim 2, further comprising a DC motor.

7. The vacuum of claim 2, wherein said power source is housed within a lower section of said housing main body and removably placed therein and accessible by a removable cap.

8. The vacuum of claim 2, wherein said housing main body has an outer diameter of approximately two inches and a height of approximately fifteen inches, and said housing flared upper end has an outer diameter of one foot and a height of approximately eight inches.

9. The vacuum of claim 2, wherein said housing further comprises a resilient and waterproof material of construction.

10. A hand-held vacuum, comprising:
a housing, comprising a main body and a flared upper end having a plurality of housing apertures and further having an opening at said housing upper end;
a fan assembly housed within said housing main body and located subjacent to said flared upper end;
a screen located on said housing main body encompassing said fan assembly;
a receptacle removably positioned within a chamber of said housing main body subjacent to said fan assembly;
a motor housed within said housing main body subjacent to said fan assembly, comprising a motor shaft driven by said motor in mechanical communication with and driving said fan assembly;
a divider panel spanning an inner diameter of said housing main body between said chamber and said motor;
a power supply housed within said housing main body subjacent to said motor and in electrical communication therewith; and,
a control switch located on an external surface of said housing main body and in electrical communication with said power supply and said motor for selectively supplying power to said motor;
wherein said vacuum induces an inward flow of air upon rotation of said fan assembly driven by said motor;
wherein said plurality of housing apertures maintains said inward flow of air when said opening of said flared upper end is placed directly on a planar surface;
wherein said receptacle provides a means for trapping and disposing of pests in a sanitary manner when said pests are entrained within said inward flow of air and pass through said opening and said fan assembly;
wherein said screen permits a circulating flow of said inflow of air through said vacuum; and,
wherein said receptacle comprises a clearance for said shaft of said motor.

11. The vacuum of claim 10, wherein said housing is generally cylindrical and said housing main body is elongated.

12. The vacuum of claim 11, wherein said plurality of housing apertures are equally-spaced about a perimeter of said flared upper end adjacent to said opening.

13. The vacuum of claim 11, wherein said fan assembly further comprises a plurality of fan blades attached to an upper end portion of said motor shaft;
wherein said plurality of fan blades destroys pests entrained within said inflow of air for subsequent collection in said receptacle.

14. The vacuum of claim 11, wherein said receptacle further comprises:
- a generally cylindrical shape having a first side with a diameter generally matching an outer diameter of said housing main body and a second side having an outer diameter generally matching an inner diameter of said housing main body;
- a pair of shoulders at each boundary of said first side and said second side;
- a collection portion having a floor; and,
- a slot inwardly extending from said second side;
- wherein said receptacle is removably positioned within said chamber wherein said slot provides clearance for rotation of said motor shaft, said pair of shoulders abuts against a pair of stop portions of said housing main body, and rests upon said divider panel such that said collection portion is subjacent to said fan assembly.

15. The vacuum of claim 11, wherein said screen further comprises a cylindrical mesh material having an outer diameter matching an outer diameter of said housing main body;
- wherein said mesh comprises apertures having a size to retain portions of said pests from exiting therethrough.

16. The vacuum of claim 11, further comprising a DC motor.

17. The vacuum of claim 11, wherein said power source is housed within a lower section of said housing main body and removably placed therein and accessible by a removable cap.

18. The vacuum of claim 11, wherein said housing main body has an outer diameter of approximately two inches and a height of approximately fifteen inches, and said housing flared upper end has an outer diameter of one foot and a height of approximately eight inches.

19. The vacuum of claim 11, wherein said housing further comprises a resilient and waterproof material of construction.

* * * * *